(12) United States Patent
Maor et al.

(10) Patent No.: US 10,587,611 B2
(45) Date of Patent: Mar. 10, 2020

(54) DETECTION OF THE NETWORK LOGON PROTOCOL USED IN PASS-THROUGH AUTHENTICATION

(71) Applicant: MICROSOFT TECHNOLOGY LICENSING, LLC., Redmond, WA (US)

(72) Inventors: Tal Joseph Maor, Tel Aviv (IL); Itai Grady Ashkenazy, Ramat Hasharon (IL); Michael Dubinsky, Tel Aviv (IL); Marina Simakov, Ashdod (IL)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 129 days.

(21) Appl. No.: 15/689,229

(22) Filed: Aug. 29, 2017

(65) Prior Publication Data

US 2019/0068573 A1 Feb. 28, 2019

(51) Int. Cl.
*H04L 29/06* (2006.01)
*G06F 21/31* (2013.01)
*H04L 29/08* (2006.01)
*H04L 12/24* (2006.01)
*G06F 11/07* (2006.01)

(52) U.S. Cl.
CPC ............ *H04L 63/083* (2013.01); *G06F 21/31* (2013.01); *H04L 41/064* (2013.01); *H04L 63/0428* (2013.01); *H04L 63/10* (2013.01); *H04L 63/12* (2013.01); *H04L 63/20* (2013.01); *H04L 63/205* (2013.01); *H04L 67/02* (2013.01); *G06F 11/079* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| 5,815,655 | A |   | 9/1998 | Teper et al. |
| 6,046,988 | A | * | 4/2000 | Schenkel ............... H04L 41/12 370/235 |

(Continued)

FOREIGN PATENT DOCUMENTS

| EP | 1501256 A2 | 1/2005 |
| WO | 2014073948 A1 | 5/2014 |

OTHER PUBLICATIONS

Levandowski; "Event ID 6038 Auditing NTLM usage"; 2017; Retrieved from the Internet: URL: https://nathanlevandowski.wordpress.com/2017/05/28/event-id-6038-auditing-ntlm-usage/ ; pp. 1-5, as printed. (Year: 2017).*

(Continued)

*Primary Examiner* — Saleh Najjar
*Assistant Examiner* — Michael W Chao

(57) ABSTRACT

The network logon protocol used in a pass-through authentication request embedded in an encrypted network packet is identified. A protocol detection engine correlates events and network requests received at a domain controller in order to use the data contained in a correlated pair to determine a size of a challenge response in the encrypted network packet. The size of the response is used to identify the network logon protocol used in the pass-through authentication request.

20 Claims, 9 Drawing Sheets

(56) References Cited

U.S. PATENT DOCUMENTS

| | | | |
|---|---|---|---|
| 8,099,452 B2* | 1/2012 | Chkodrov | G06F 1/12 709/201 |
| 8,255,984 B1 | 8/2012 | Ghostine et al. | |
| 8,861,505 B1 | 10/2014 | DeLaBroise et al. | |
| 8,887,233 B2 | 11/2014 | Krishna | |
| 9,450,944 B1 | 9/2016 | Sousley et al. | |
| 9,807,104 B1* | 10/2017 | Sarra | H04L 63/1416 |
| 10,372,722 B2* | 8/2019 | Lamas | G06F 16/2455 |
| 10,404,556 B2* | 9/2019 | Reynolds | H04L 41/145 |
| 10,417,225 B2* | 9/2019 | Tankersley | G06T 11/206 |
| 2002/0150253 A1 | 10/2002 | Brezak et al. | |
| 2004/0210756 A1* | 10/2004 | Mowers | H04L 63/0807 713/168 |
| 2005/0022189 A1* | 1/2005 | Proulx | H04L 41/00 718/100 |
| 2007/0157312 A1* | 7/2007 | Joubert | H04L 63/0263 726/22 |
| 2008/0168545 A1* | 7/2008 | Inoue | G06F 21/41 726/6 |
| 2008/0209402 A1* | 8/2008 | Parkinson | G06F 11/3495 717/124 |
| 2010/0192201 A1* | 7/2010 | Shimoni | G06F 21/55 726/3 |
| 2010/0318397 A1 | 12/2010 | Singh et al. | |
| 2013/0124465 A1* | 5/2013 | Pingel | G06F 3/0604 707/610 |
| 2015/0150125 A1* | 5/2015 | Dulkin | H04L 63/20 726/22 |
| 2015/0170037 A1* | 6/2015 | Lvin | G06N 5/04 706/52 |
| 2016/0088000 A1* | 3/2016 | Siva Kumar | H04L 63/083 726/23 |
| 2017/0041136 A1 | 2/2017 | Niemczyk et al. | |
| 2017/0142094 A1 | 5/2017 | Doitch et al. | |
| 2017/0168882 A1* | 6/2017 | Brew | G06F 11/079 |
| 2019/0273731 A1* | 9/2019 | Kassner | H04L 45/74 |
| 2019/0312796 A1* | 10/2019 | Giura | H04L 43/0876 |

OTHER PUBLICATIONS

Wright et al.; On Inferring Application Protocol Behaviors in Encrypted Network Traffic; 2006; Retrieved from the Internet: URL: http://www.jmlr.org/papers/v7/wright06a.html; pp. 1-25, as printed. (Year: 2006).*

MS-APDS; Authentication Protocol Domain Support; 2016; Retrieved from the Internet: URL: https://winprotocoldoc.blob.core.windows.net/productionwindowsarchives/MS-APDS/%5bMS-APDS%5d-160714.pdf ; pp. 1-45, as printed. (Year: 2016).*

Canervari; "NTLM V1 . . . no, excuse me . . . NTLM V2 . . . oh, no, you were right . . . it's V1 . . . "; 2010; Retrieved from the Internet: URL: https://blogs.msdn.microsoft.com/openspecification/2010/05/03/ntlm-v1-no-excuse-me-ntlm-v2-oh-no-you-were-right-its-v1/; pp. 1-8, as printed. (Year: 2010).*

"International Search Report & Written Opinion Issued in PCT Application No. PCT/US18/039631", dated Oct. 23, 2018, 12 Pages.

"1.3.1 Pass-Through Authentication", http://msdn.microsoft.com/en-us/library/cc237015.aspx, Retrieved on: Jul. 10, 2017, 2 pages.

Canevari, Sebastian, "NTVM V1 . . . no, excuse me . . . NTLM V2 . . . oh,no, you were right . . . it's V1 . . . ", https://blogs.msdn.microsoft.com/openspecification/2010/05/03/ntlm-v1-no-excuse-me-ntlm-v2-oh-no-you-were-right-its-v1/, Published on: May 3, 2010, 9 pages.

"4.1 NTLM Pass-Through Authentication", https://msdn.microsoft.com/en-us/library/cc224019.aspx, Retrieved on: Jun. 28, 2017, 1 page.

"Troubleshooting NTLM", http://docs.alfresco.com/4.0/tasks/troubleshoot-ntlm.html,Retrieved on: Jun. 28, 2017, 3 pages.

Gamache, Mark R., "NTLM Challenge Response is 100% Broken (Yes, this is still relevant)", https://markgamache.blogspot.in/2013/01/ntlm-challenge-response-is-100-broken.html, Published on: Jan. 8, 2013, 7 pages.

"Network Security: Restrict NTLM: NTLM authentication in this domain", https://technet.microsoft.com/en-us/library/j852241 (v=ws.11).aspx, Published on: Nov. 15, 2012, 4 pages.

Yaron, Ziner, "The Security Risks of NTLM: Proceed with Caution", https://blog.preempt.com/the-security-risks-of-ntlm-proceed-with-caution, Published on: Oct. 20, 2016, 6 pages.

"Preparations for assessing NTLM usage", https://technet.microsoft.com/en-us/library/jj865665(v=ws.10).aspx, Published on: Nov. 29, 2012, 11 pages.

"3.5.4.5.2 NetrLogonSamLogonWithFlags (Opnum 45)", https://msdn.microsoft.com/en-us/library/cc237250.aspx, Retrieved on: Jul. 10, 2017, 2 pages.

"3.5.4.5.1 NetrLogonSamLogonEx (Opnum 39)", https://msdn.microsoft.com/en-us/library/cc237249.aspx, Retrieved on: Jul. 10, 2017, 3 pages.

"2.2.2.6 NTLM v1 Response: NTLM_RESPONSE", https://msdn.microsoft.com/en-us/library/cc236651.aspx, Retrieved on: Jul. 10, 2017, 1 page.

"2.2.2.8 NTLM v2 Response: NTLMv2_RESPONSE", https://msdn.microsoft.com/en-us/library/cc236653.aspx, Retrieved on: Jul. 10, 2017, 1 page.

Kok, Richard, "Wireshark: Determining a SMB and NTLM version in a Windows environment", https://richardkok.worldpress.com/2011/02/03/wireshark-determining-a-smb-and-ntlm-version-in-a-windows-environment/,Feb. 3, 2011, 15 pages.

"3.5.4.5.3 NetrLogonSamLogon (Opnum 2)", https://msdn.microsoft.com/en-us/library/cc237251.aspx, Retrieved on: Jul. 10, 2017, 1 page.

* cited by examiner

DETECTION OF THE NETWORK LOGON PROTOCOL USED IN PASS-THROUGH AUTHENTICATION

BACKGROUND

Computer security relies on various access control mechanisms to prevent unauthorized users and malicious attackers from gaining access to shared computer resources. Typically, a user goes through a logon procedure in which the computer determines if the user is authorized to use the computer. In order for the user to access resources through a network, the user authenticates with a server that is responsible for authenticating the user and controlling the user's access to the network resources. Typically, there is a single logon request that obtains authorization to access the computer and the network in one logon process.

In a domain-based network, users and machines within the domain are authenticated by a domain controller. The domain controller maintains a user account database and is responsible for authenticating the user by validating the user's credentials. A server receives a logon request and passes the user's credentials securely to the domain controller that is associated with the domain of the user's account. The domain controller validates the credentials and returns to the server those attributes of the user's account that the server can use in authorization decisions. This is commonly referred to as pass-through authentication since the user's authentication request is passed from the server to the domain controller.

There are various authentication protocols that can be used in a logon process. A user's machine maybe using a legacy authentication protocol within a domain that is more susceptible to security risks and vulnerabilities than a recent authentication protocol that has stronger security mechanisms. The identification of the logon protocol used by a user's machine to initiate a logon request is important in maintaining a secure domain.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The network logon protocol used in a pass-through authentication request is identified. When the pass-through authentication request is encrypted, a protocol detection engine pairs or associates an event with a network packet. The pairing is based on close temporal proximity. The pairing is performed in order to use the data in the event to estimate the size of a challenge response or response embedded in the encrypted network packet. The response is a cryptographic hash of a user's password. The estimated size of the response is used to determine the identity of the network logon protocol used to initiate the user's logon request. Actions are then taken to deter the use of any legacy network logon protocol.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
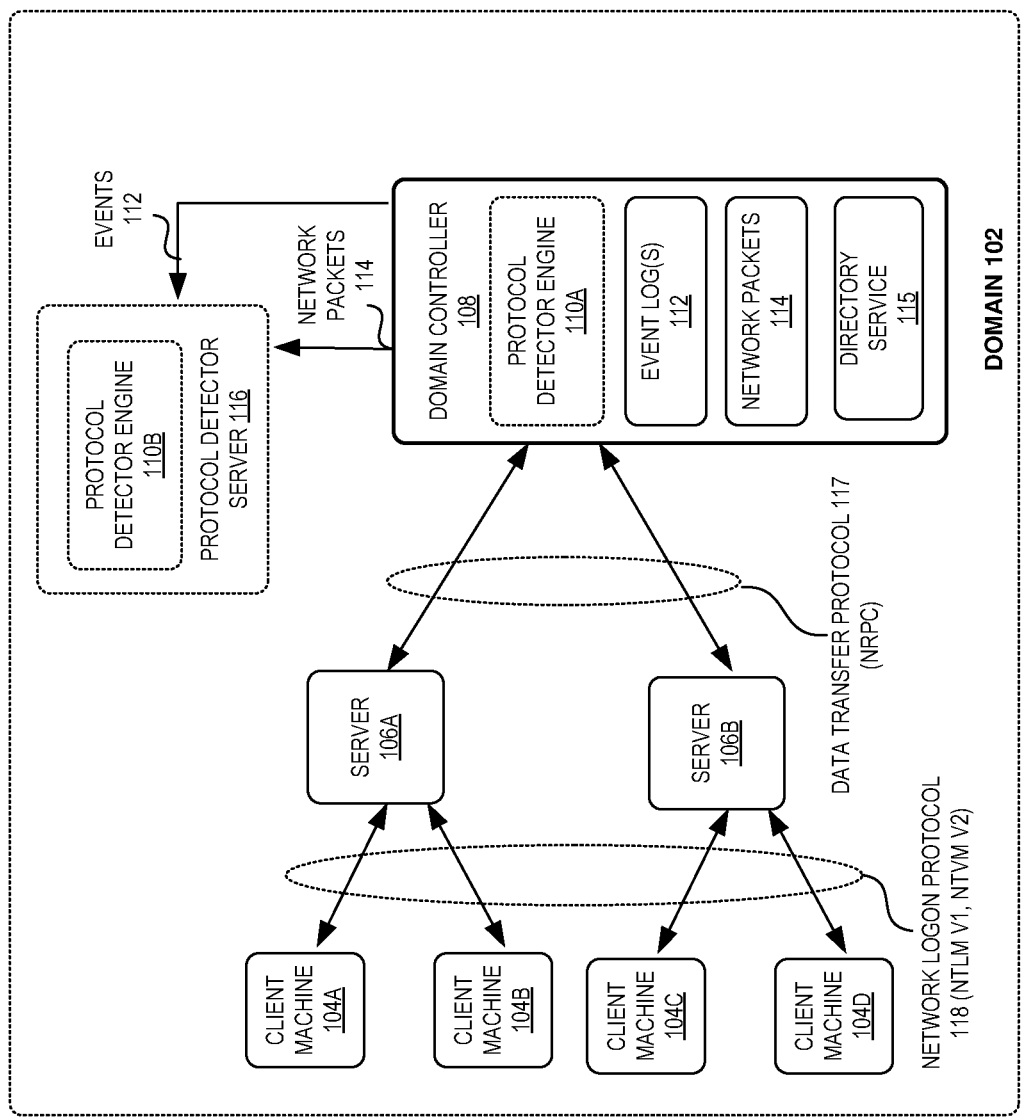
FIG. 1 illustrates an exemplary system for detecting the network logon protocol used in a pass-through authentication.

FIG. 1 illustrates a block diagram of an exemplary system 100. In one aspect of the subject matter disclosed herein, the system 100 includes at least one domain 102 that includes one or more client machines 104A-104D (collectively 104), one or more servers 106A-B (collectively 106), and at least one domain controller 108. A domain 102 is a group of users and computers that share a common management infrastructure. The domain 102 includes at least one domain controller 108 that hosts a list of the members of the domain 102 and a directory service 115. The directory service 115 stores information about the components of the network, such as without limitation, user accounts, computer accounts, groups, and all related credential information. A server 106 controls access to the resources of the network (printers, files, etc.) and is communicatively coupled to one or more client machines 104 and to at least one domain controller 108.

The domain controller 108 is a computing device that manages the domain 102. The domain controller 108 includes the following components: a protocol detector engine 110A; one or more event logs 112; one or more network packets 114; and a directory service 115. The protocol detector engine 110A determines the protocol that is used to request authentication. An event log 112 tracks user actions and system resource usage events within the domain 102. The network packets 114 are the packets sent to the domain controller 108 from a server 106.

Alternatively, the domain 102 may include a protocol detector server 116, separate from the domain controller 108, to determine the network logon protocol. The protocol detector server 116 receives the event logs 112 and network packets 114 from the domain controller 108 and utilizes a protocol detector engine 110B to determine the network logon protocol used to request user authentication.

In one aspect, a client machine 104 interacts with a server 106 through a network logon protocol 118 such as, without limitation, NT Logon Machine (NTLM) version one or NTLM version two. The server 106 interacts with the domain controller 108 through a data transfer protocol, such as a Remote Procedure Call (RPC) interface 117, such as Netlogon Remote Protocol (NRPC).

Although the system 100 shown in FIG. 1 has a limited number of elements in a certain configuration, it should be appreciated that the system 100 can include more or less elements in alternate configurations. The embodiments are not limited in this manner. For example, the system 100 is not constrained to a domain-based network infrastructure and may be used in domain-alternative based systems and non-Microsoft Active Directory systems such as without limitation, Lightweight Directory Access Protocol (LDAP) systems, Open LDAP, Apache Directory, Univention Corporation Server (UCS), Lepide Auditor For Active Directory, JXplorer, FreeIPA, Samba, GoSa, eDirectory, Zentyal, 389 Directory Server, Red Hat Directory Server, OpenSSO, SME Server, Resara Server, Sun Java System Directory Sever, Oracle Directory Server Enterprise Edition, IBM Tivoi Directory Server, Lotus Domino, and the like.

Alternatively, the system described herein may be configured to work in a WiFi-enabled service, such as without limitation, RADIUS-as-a-Service and in a cloud-based directory model, such as without limitation, Directory-as-a-Service (DaaS), JumpCloud, and the like. Furthermore, the network logon protocol is not limited to NTLM and other network logon protocols can be used, such as without limitation, Kerberos, Authentication and Key Agreement (AKA), CRAM-MS, Digest access authentication, Cellular Authentication and Voice Encryption (CAVE) based authentication, and the like. The data transfer protocols are not limited to NRPC and other data transfer protocols can be used. It should be noted that a client machine may make a logon request that the server transmits to a domain controller that is not within the domain of the client machine.

Figure 2:
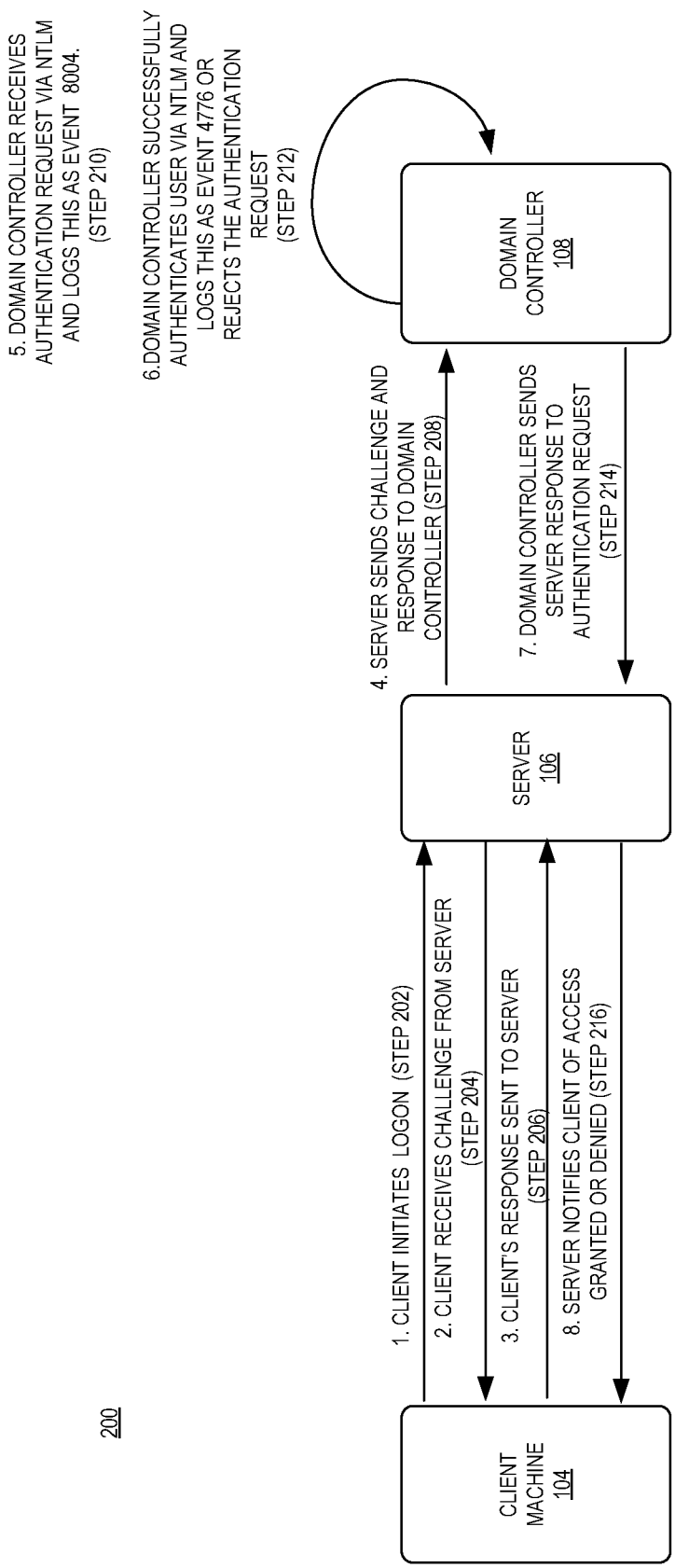
FIG. 2 is a block diagram illustrating an exemplary process flow of a pass-through authentication.

FIG. 2 illustrates an exemplary NTLM pass-through authentication flow 200. One or more users perform an interactive logon through a client machine 104. In one aspect, the NTLM authentication protocol is the network logon protocol used to prove or authenticate the user's identity to the domain controller. The NTLM pass-through authentication flow 200 is a challenge-response mechanism where a user at a client machine 104 initiates a logon (step 202). The logon includes a domain name, a user name and a password. The client machine 104 computes a cryptographic hash of the password (step 202). The client machine 104 sends the user name to the server 106 (step 202).

The server 106 issues a challenge or nonce to the client machine 104 (step 204). The client machine 104 responds to the challenge using the cryptographic hash of the user's password which is sent to the server 106 (step 206). This is referred to as the response (step 206).

The messages that flow between the client machine 104 and the server 106 are transmitted in accordance with the NTLM authentication protocol specification. The NTLM messages are embedded into packets of an application protocol that specifies how the NTLM messages are encoded, framed and transported. In one aspect, the NTLM messages between the client and server are embedded into the Server Message Block (SMB) protocol.

The server 106 utilizes Netlogon which is a service that is focused on verifying user credentials and other services within a domain. It is a service and not an application and as such, Netlogon runs as a background process in the server 106. The Netlogon service verifies logon requests and registers, authenticates, and locates the domain controller associated with a logon request. In addition, the Netlogon service provides a secure channel between the client machine 104 and the domain controller 108 to pass the authentication packets. The Netlogon service uses a remote procedure call interface to implement the user and machine authentication. This interface is commonly referred to as Netlogon Remote Procedure Call (NRPC) or Distributed Computing Environment/Remote Procedure Call (DCE/RPC) over Netlogon. The remote procedure call interface utilizes methods that are called using defined parameters or structures. These calls and the structures are formatted into a network packet that is transmitted via a transmission protocol to the domain controller. The network packet can contain portions that are encrypted and/or portions that are unencrypted.

The server 106 then sends the user name, the challenge and the response to the domain controller 108 (step 208). The domain controller 108 uses the user name to retrieve the hash of the user's password to encrypt the challenge. The domain controller 108 compares the encrypted challenge computed by the domain controller 108 with the response computed by the client machine 104. When the two are identical, the authentication is successful.

The domain controller 108 logs an event, such as event 8004, when the authentication request is made through NTLM (step 210). The domain controller 108 either successfully authenticates the user's request or rejects the user's request (step 212). When a request made through NTLM is successfully authenticated, the domain controller 108 logs this event as event 4776. The domain controller 108 through the Netlogon service sends the server 106 a response to the authentication request (step 214) and the server 106 notifies the client machine 104 whether the access is granted or denied (step 216).

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
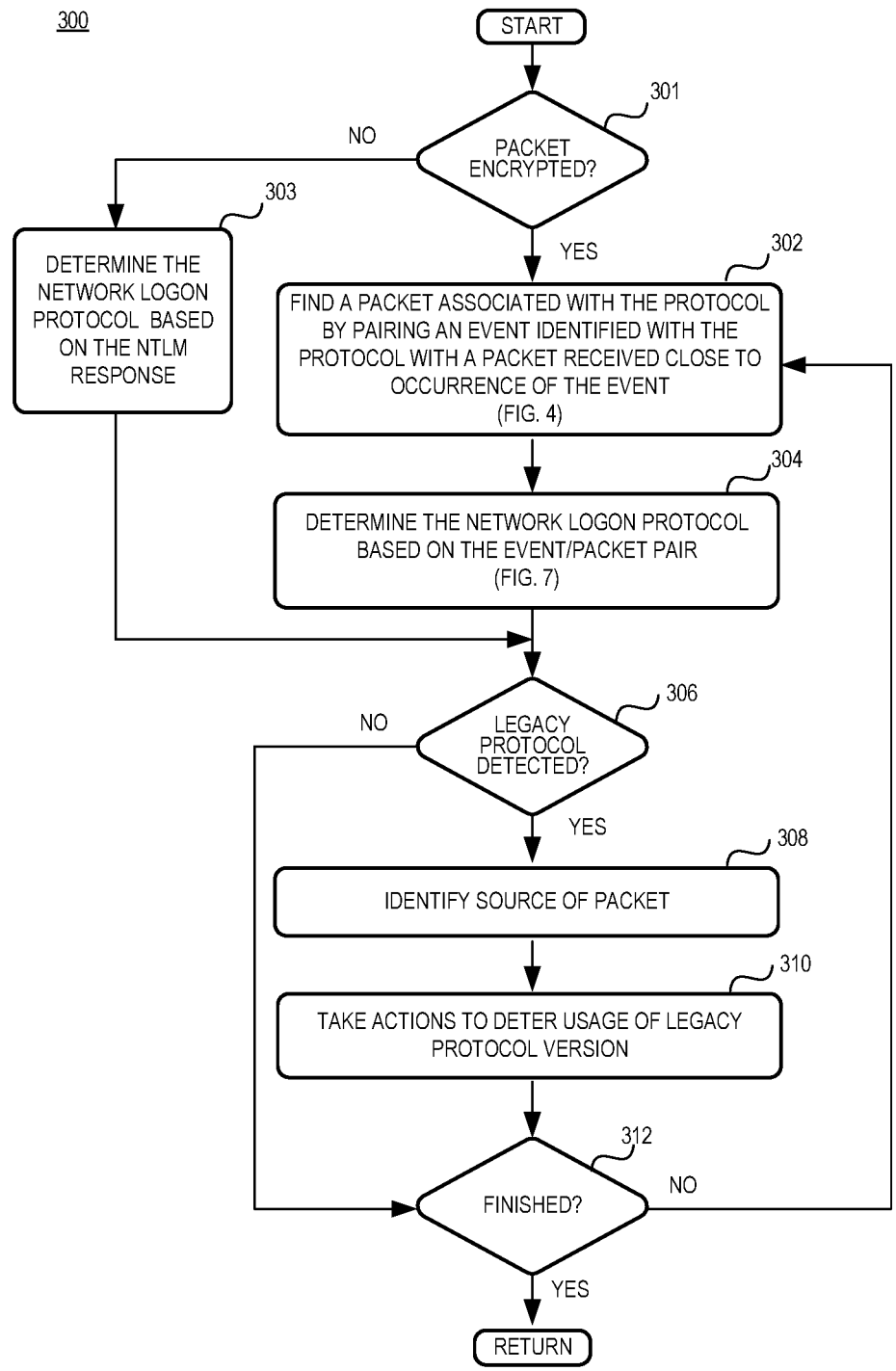
FIG. 3 is a flow diagram illustrating an exemplary method for detecting the network logon protocol in a pass-through authentication.

FIG. 3 illustrates a flow diagram of an exemplary method 300 performed by the protocol detector engine for detecting the network logon protocol used in a pass-through authentication request. The method 300 pairs event data generated by the domain controller with a network packet used in a pass-through authentication request when the network packet is encrypted. The paired event data is then used to determine the size of the challenge embedded in the encrypted portion of the network packet. The size of the challenge is then used to determine the network logon protocol used in the pass-through authentication request.

Turning to FIG. 3, the protocol detector engine determines if portions of the network packet are encrypted (block 301). This can be determined by reading the value of an attribute in the unencrypted portion of the network packet (block 301). If the network packet is encrypted (block 301—yes), then the method proceeds to determine the network logon protocol based on the paired event and data (block 304). Otherwise, if the network packet is not encrypted (block 301—no), then the network logon protocol is determined based on the unencrypted NTLM response (block 303). When the pass-through structure of the network packet is not encrypted, the protocol detector engine can readily read the NTLM response and determine its size. In one aspect, when the NTLM response is a fixed size of 24 bytes, the network logon protocol is NTLM version one and when the NTLM response is a variable size greater than 24 bytes, the network logon protocol is NTLM version two (block 303).

When portions of the data in the network packet are encrypted (block 301—yes), the protocol detector engine correlates or pairs an event with a network packet (block 302). The event log of the domain controller tracks events that occur at the domain controller. These events include requests for authentication. The data in the event log is not encrypted. The network packets are received by the domain controller. By pairing or matching an event with a network packet, the protocol detector engine obtains additional data needed to determine the authentication protocol used in the pass-through authentication request (block 302).

The data contained in a paired event and network packet are analyzed to determine the identity of the network logon protocol (block 304). If a legacy protocol is detected (block 306—yes), then the identity of the source machine is determined (block 308). In some instances, the identity of the server can be determined from the network packet and in other instances, the identity of the client machine can be determined from a parameter or structure used in a particular RPC method call (block 308).

Once the identity of the client machine or sever is known, actions are taken to deter the use of the legacy protocol (block 310). These actions can include warning messages, eliminating the source machine or server from the domain, and the like (block 310). If a legacy protocol is not detected (block 306—no) and the process is not finished (block 312—no), then the process repeats (blocks 302-310) until completed (block 312—yes).

Figure 4:
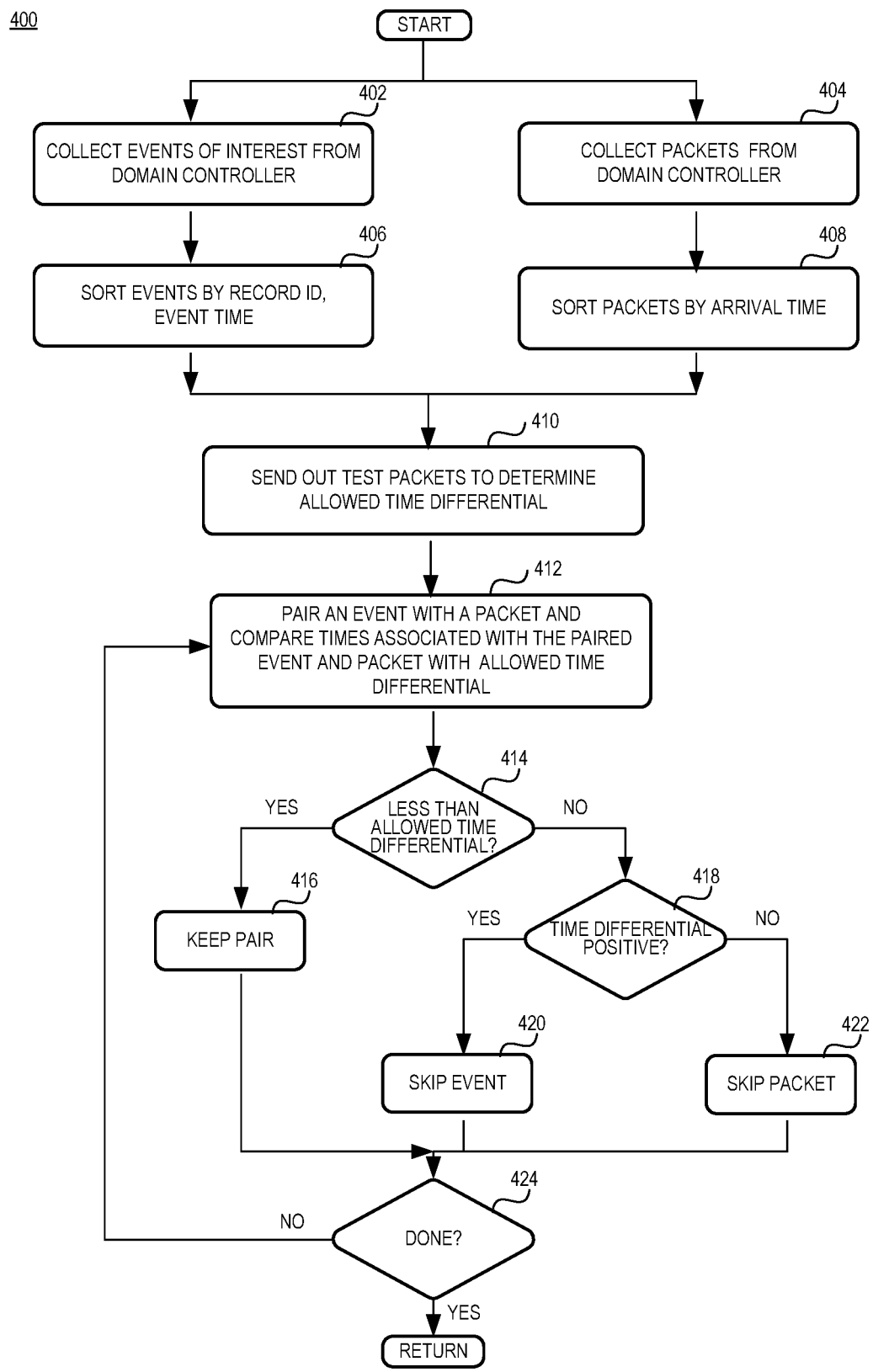
FIG. 4 is a flow diagram illustrating an exemplary method for pairing an event associated with a NTLM request with a network packet.

Attention now turns to a more detailed description of the process of pairing an event with a network packet. Turning to FIG. 4, there is shown an exemplary method 400 of this pairing process. The protocol detector engine receives events from the event log of the domain controller (block 402) and network packets that the domain controller received (block 404). The events are sorted by record identifier (record id) and by event time (block 406). The sort on the record identifier will place the records in an increasing order so that needed events (e.g., events 8004 and/or 4776) are found quickly. The sort on the event time is made to order the events in an increasing chronological order. The needed events are then selected and placed in an event list (block 406).

The network packets from the domain controller are collected (block 404) and sorted by arrival time (block 408). The arrival time is the time the packet was received by the domain controller (block 408). These network packets are placed in a packet list in increasing chronological order (block 408).

An allowed time differential is calculated (block 410). The allowed time differential represents an estimated transit time for a network packet to travel from a server to either the domain controller or the protocol detector server. The allowed time differential is used to correlate a time associated with an event with a time associated with a network packet. The time differential is calculated by sending out a test packet to those servers who have recently communicated with the domain controller (block 410). The test packet is used to create a network packet that is sent from the server to the domain controller and to cause the domain controller to create an event that is logged in the domain controller (block 410). The allowed time differential is calculated as the difference between the timestamp of the network packet and the timestamp in the corresponding event (block 410). The allowed time differential can be recomputed at preconfigured time intervals, such as every ten seconds in order to ensure the accuracy of this calculation. It should be noted that the calculation of the allowed time differential need not be performed in the manner shown in FIG. 4 and that this calculation may be performed before the pairing process or at any other point in the process before it is needed.

An event is then paired with a network packet (block 412). The time of an event from the top of the event list is compared with the arrival time of a network packet from the top of the packet list (block 412). If the difference between the event time and the arrival time of the packet is less than the allowed time differential (block 414—yes), then the event and network packet are deemed related or paired and placed on a pair list (block 416).

If the difference between the event time and the arrival time of the packet is greater than the allowed time differential (block 414—no), then either the event occurred earlier than the arrival time of the next network packet or the network packet arrived before the event occurred. If the difference is a positive value (block 418—yes), then the event occurred before the packet on the top of the packet list arrived and the event is skipped (block 420). If the difference is not a positive value (block 418—no), then the packet arrived before the event on the top of the event list occurred and the network packet is skipped (block 422).

The pairing is performed until there are no more events and/or network packets in their respective lists. If additional events and network packets are available, the pairing continues (block 424—no, blocks 412-424) until there are no more events and/or network packets are in their respective lists (block 424—yes).

Attention now turns to a description of how the data in the paired event and network packet is used to determine the network logon protocol.

The Netlogon RPC interface includes various methods and structures to support a pass-through authentication request. These methods are classified by an operation number or opnum. For example, opnum 2 is known as the NetrLogonSamLogon method that updates the user's lastlogon attribute for the Secuity Account Manager (SAM). Opnum 39 is known as the NetrLogonSamLogonEx method which transmits a pass-through authentication request. Opnum 45 is known as the NetrLogonSamLogonWithFlags method which handles logon requests for the SAM in accordance with specific flagged settings. The server utilizes the Netlogon RPC interface to initiate a particular method, identified by an opnum, with its corresponding structure. The structure is transmitted in a network packet to the domain controller. The structure is typically encrypted and includes the response provided by the network logon protocol. The size of the response is indicative of the network logon protocol used by the client machine to make the pass-through authentication request.

Figure 5:
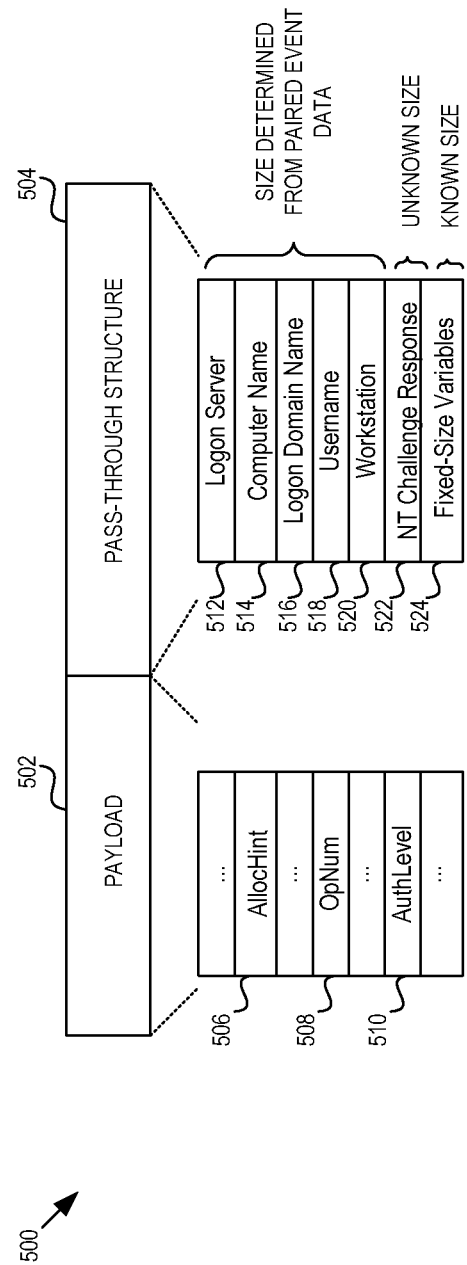
FIG. 5 is a diagram illustrating an exemplary layout of a network packet.

Turning to FIG. 5, there is shown an exemplary layout of a network packet 500 that contains a payload 502 and a pass-through structure 504. In one aspect, the payload is unencypted and the pass-through structure 504 is encrypted. The payload 502 includes a number of fields, such as, AllocHint 506, OpNum 508, and AuthLevel 510. AllocHint 106 includes the size of the encrypted pass-through structure 504, OpNum 508 represents the particular Netlogon RPC method, and AuthLevel 510 contains a value that indicates whether or not the pass-through structure is encrypted.

The pass-through structure contains a number of fields, such as LogonServer 512, ComputerName 514, LogonDomainName 516, Username 518, Workstation 520, NTChallengeResponse 522, and other fixed-sized variables 524. The LogonServer 512, ComputerName 514, LogonDomainName 516, Username 518, Workstation 520 are variable-sized fields whose values are contained in the event data. LogonServer 512 identifies the server that initiated the pass-through request, ComputerName 514 identifies ADD IN MORE, LogonDomainName 516 identifies the domain of the client machine, Username 518 is the name of the user's account on the client machine, and Workstation 520 identifies the client machine. NTChallengeResponse 522 is the NTLM response. In NTLM version one, the size of the NTChallengeResponse is fixed at 24 bytes and in NTLM version two, the size of NTChallengeResponse is larger than 24 bytes.

The protocol detector engine estimates the size of the pass-through structure and compares it with a threshold to determine the network logon protocol. In one aspect, the protocol detector engine estimates the size of the pass-through structure from the known sizes in the structure and from the variable-sized fields that are contained in the associated event. As shown in FIG. 5, the size of LogonServer 512, ComputerName 514, LogonDomainName 516, Username 518, and Workstation 520 are of a variable length but their respective lengths can be obtained from a corresponding variable in the event. There are also other fixed-size variables whose lengths are known from the structure's pre-configuration.

Figure 6:
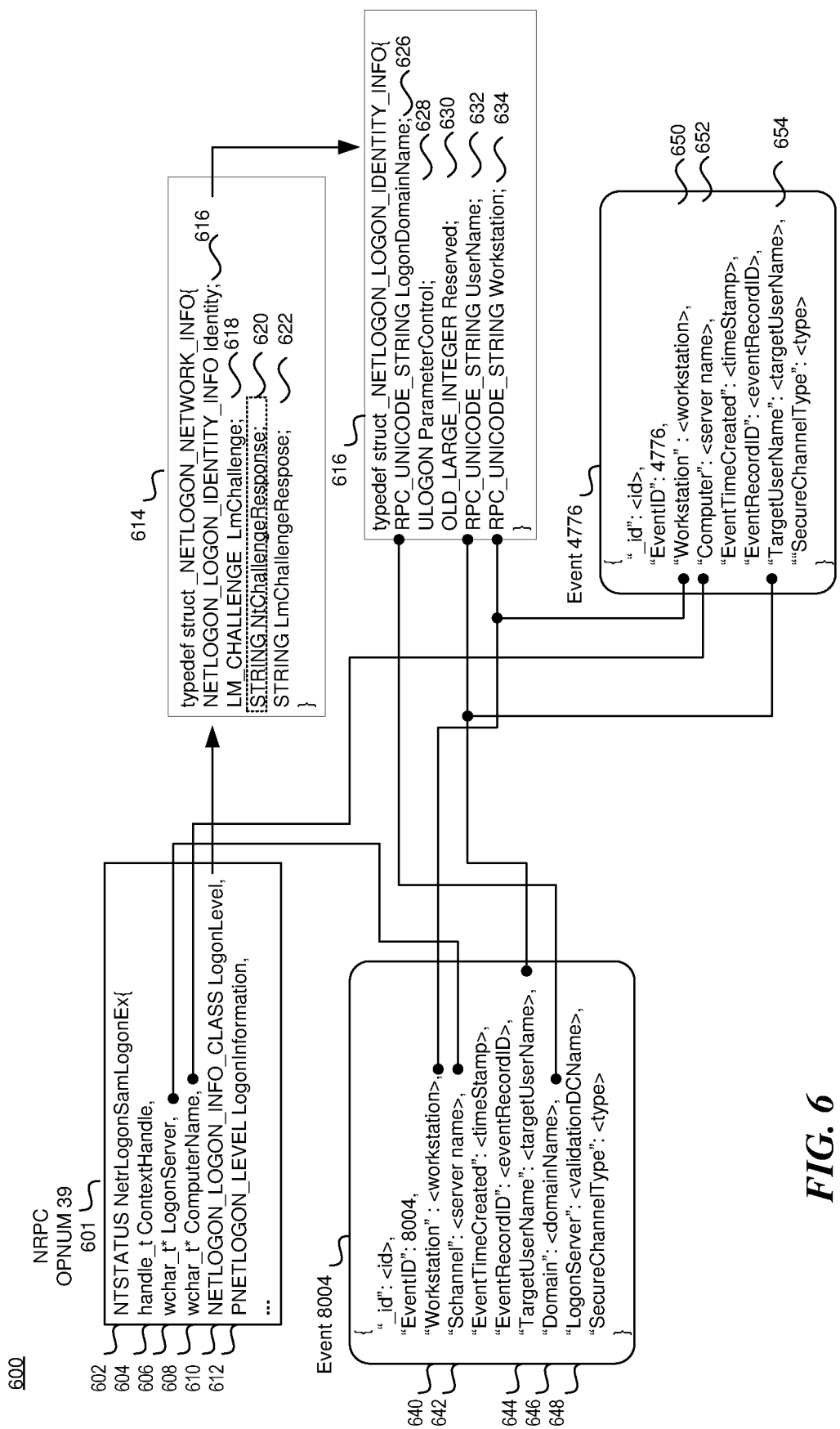
FIG. 6 is a diagram illustrating an exemplary mapping of the event data to a particular structure of a network packet.

Turning to FIG. 6, there is shown a diagram illustrating a mapping of the data from an event that is used to determine the estimated size of the pass-through structure of a network packet. In this example, the pass-through structure 600 is for opnum 39 which is the NetrLogonSamLogonEx method 602. The structure for the opnum 39 method 601 includes fixed-sized variables, ContextHandle 604 and PNETLOGON_LEVEL LogonInformation 612. LogonServer 606 and ComputerName 608 are variable-length variables whose sizes are obtained from the associated event. The opnum 39 structure 601 includes a sub-structure NETLOGON_LOGON_INFO_CLASS LogonLevel 610 whose layout is shown in sub-structure 614. In the NETLOGON_LOGON_INFO sub-structure 614, there are fixed-sized variables LM_CHALLENGE 618 and LmChallengeResponse 622, a sub-structure NETLOGON_LOGON_IDENTITY_INFO 616, and NtChallengeResponse 620. The size of NtChallengeResponse 620 is unknown. The sub-structure NETLOGON_LOGON_IDENTITY_INFO 616 contains fixed-size variables ULOGON ParameterControl 628, OLD_LARGE_INTEGER 630 and variable-sized variables LogonDomainName 626, UserName 632, and Workstation 634. The size of LogonDomainName 626, UserName 632, and Workstation 634 are obtained from the associated event.

The protocol detector engine computes the size of the structure for NetrLogonSamLogonEx from the known sizes of the fixed-length fields or variables and by obtaining the length of the variable-sized fields from the associated event. For example, if the network packet is paired with event 8004, then the data from event 8004 is used to determine the sizes of certain variables of the structure. As shown in FIG. 6, event 8004 contains the workstation name 640, the server name 642, the target user name 644, the domain name 646, and the logon server name 648. The data from event 8004 is used to determine the size of the variable-length variables in the NETLOGON_LOGON_IDENTITY_INFO sub-structure 616 and in the opnum 39 structure 601. The size of workstation name 640 in event 8004 is used to determine the size of Workstation 634, the size of the server name 642 in event 8004 is used to determine the size of LogonServer 606, the size of targetUserName 644 in event 8004 is used to determine the size of UserName 632, the size of domainName 646 in event 8004 is used to determine the size of LogonDomainName 626, and the size of LogonServer 648 in event 8004 is used to determine the size of ComputerName 608.

If the network packet is paired with event 4776, the data from event 4776 can be used to determine the size of variable-length variables in the structure. As shown in FIG. 6, event 4776 contains the workstation name 650, serverName 652, and targetUserName 654. The size of workstation 650 is used to determine the size of Workstation 634, the size of server name 652 is used to determine the size of LogonServer 606, the size of targetUserName 654 is used to determine the size of UserName 632. The size of LogonDomainName 626 is extracted from servername 652 of event 4776. The ComputerName 608 of event 4776 can be obtained from the binding of the netlogon session. The binding is performed initially before each logon session and includes the name of the server which is the ComputerName 608.

Figure 7:
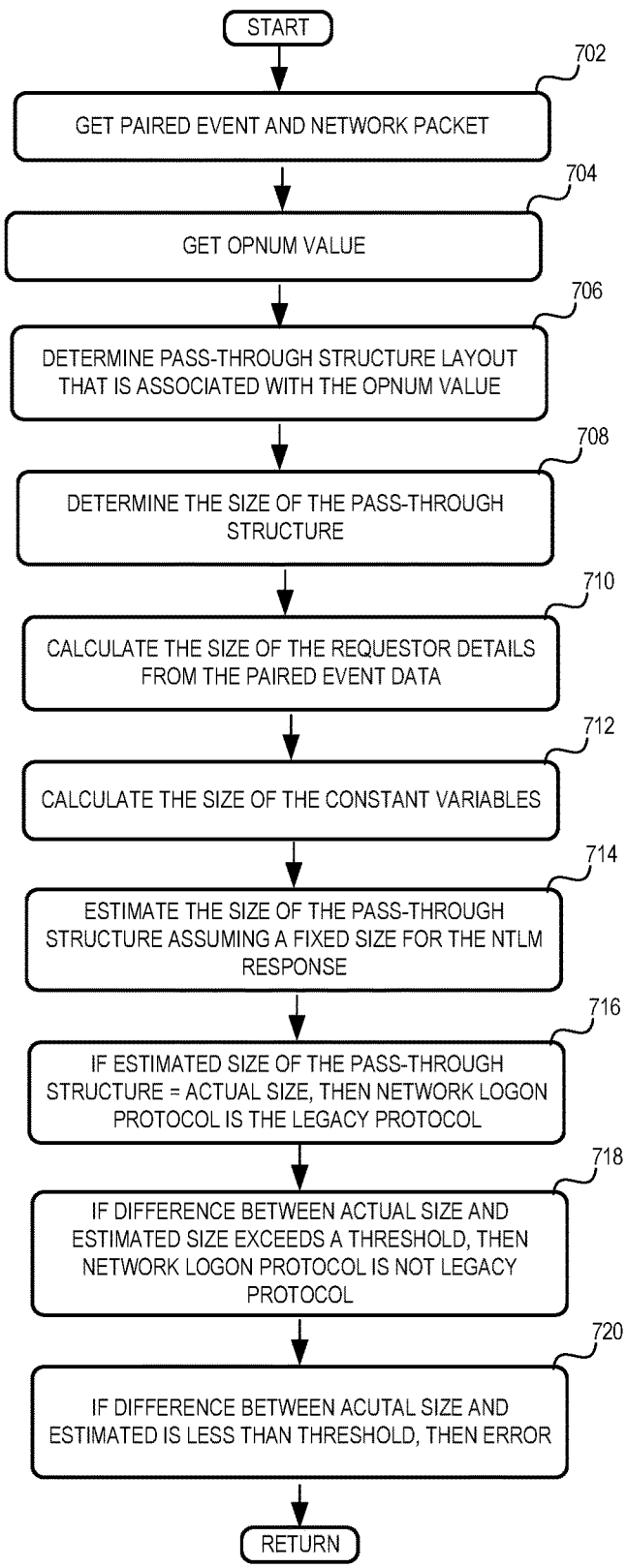
FIG. 7 is a flow diagram illustrating an exemplary method for determining the network logon protocol used in the pass-through authentication request using the size of the response in the network packet.

Attention now turns to a more detailed description of how this mapping is used to determine the network logon protocol. Referring to FIG. 7, there is an exemplary method 700 that describes the manner in which the network logon protocol is determined based on the paired event/network packet.

The protocol detector engine obtains a paired event and network packet (block 702). The protocol detector engine obtains the opnum value from the unencrypted portion of the network packet (block 704) and determines the layout of the pass-through structure that is associated with the opnum value (block 706). The size of the pass-through structure is determined from the AllocHint variable (block 708). The size of the requestor details is obtained from the paired event data, Size(LogonServer, ComputerName, LogonDomainName, UserName, WorkstationName) (block 710). The requestor details includes the LogonServer, the ComputerName, the LogonDomainName, the UserName, and the Workstation name (block 710). The size of the constant variables or fixed-sized variables, constant variable size, is calculated from a known configuration or layout of the opnum structure and represented as (block 712). The protocol detector engine then computes an estimated size of the encrypted pass-through structure, EstimatedSize, assuming a fixed size for the NtChallengeResponse, NTLM version one size (block 714). This computation can be represented mathematically as follows:

EstimatedSize=[Size(LogonServer,ComputerName, LogonDomainName,UserName,Workstation-Name)+constant variable size+NTLM version one size].

If the estimated size of the pass-through structure, EstimatedSize, is equal to the actual size of the pass-through structure or AllocHint, then the network logon protocol is determined to be NTLM version one which is this situation is a legacy protocol (block 716).

If the difference between the actual size of the pass-through structure, AllocHint, and the estimated size of the pass-through structure, EstimatedSize, exceeds a pre-determined threshold, then the network logon protocol is determined to be a current version of the protocol and not a legacy protocol (block 718). In one aspect, the threshold is computed as 35 bytes. The 35 bytes represents the difference in the size of the NTChallengeResponse variable in NTLM version one and the size of the NTChallengeResponse variable in NTLM version two. The NTChallengeResponse in NTLM version two includes additional variables, such as the AV Pairs structure, that are not in the NTChallengeResponse of NTLM version one. When the difference between the actual size of the pass-through structure, AllocHint, and the EstimatedSize is less than 35 bytes, then the identity of the network logon protocol cannot be determined (block 720). In one aspect, basic authentication could have been used which is a simple authentication protocol that sends a clear text password or hash of a clear text password for validation by the domain controller.

Technical Effect

Aspects of the subject matter disclosed herein pertain to the technical problem of identifying the network logon protocol used in a pass-through authentication request in order to maintain the security of the devices within the domain. The pass-through authentication request encrypts the response of the network logon protocol thereby making it difficult to determine identity of the network logon protocol. In addition, the size of the response differs in certain network logon protocols. The technical feature associated with addressing this problem involves a protocol detection engine that pairs an event that is logged when the authentication request is made to find the size of the response in a corresponding encrypted pass-through authentication packet in order to determine the network logon protocol that was used in the pass-through authentication request. If the network logon protocol is identified as a legacy protocol, the system may take actions to deter the use of the legacy protocol. The legacy protocol may be susceptible to malicious attacks and other security vulnerabilities that compromise the domain.

Exemplary Operating Environments

Figure 8:
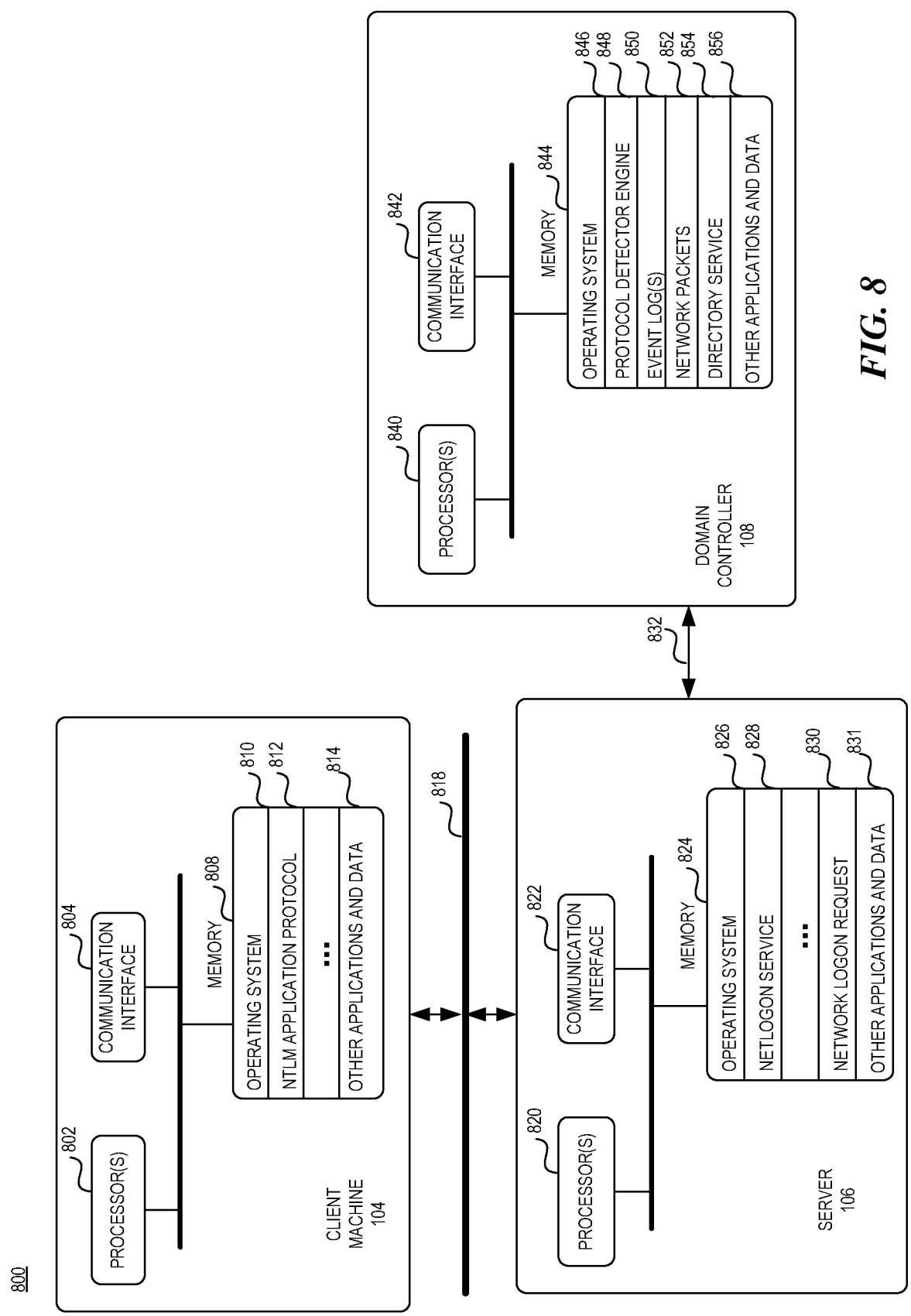
FIG. 8 is a block diagram illustrating a first exemplary operating environment.

Attention now turns to a discussion of exemplary operating embodiments. In a first exemplary operating environment, the protocol detection engine operates in a domain controller and in a second exemplary operating environment, the protocol detection engine operates on a server separate from the domain controller. Turning to FIG. 8, the aspects may be applied to the first operating environment 800 that utilizes at least client machine 104, a server 106, and a domain controller 108. The client machine 104, server 106, and the domain controller 108 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The first operating environment 800 may be configured in a network environment, a distributed environment, a multi-processor environment, or a stand-alone computing device having access to remote or local storage devices.

Each of the client machines 104, server 106 and the domain controller 108 includes one or more processors 802, 820, 840, a communication interface 804, 822, 842 and a memory 808, 824, 844. A processor 802, 820, 840 may be any commercially available or customized processor and may include dual microprocessors and multi-processor architectures. The communication interface 804, 822, 842 facilitates wired or wireless communications between a computing device 104, 108 and other devices. The memory 808, 824, 844 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 808, 824, 844 may also include one or more external storage devices or remotely located storage devices that do not pertain to propagated signals, such as modulated data signals transmitted through a carrier wave.

The memory 808 of the client machine 104 contains instructions, components, and data. The memory 808 may include an operating system 810, an NTLM application protocol 812, and other applications and data 814. The memory 824 of the server 106 contains instructions, components, and data, such as an operating system 826, a Netlogon service 828, a network logon request 830, and other applications and data 831. The memory 844 of the domain controller 108 contains instructions, components, and data such as an operating system 846, a protocol detector engine 848, one or more event logs 850, network packets 852, a directory service 854, and other applications and data 856.

The client machine 104 communicates with the server 106 through a first network 818 and the server 106 communicates with the domain controller 108 though a second network 832. The networks 818, 832 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

Figure 9:
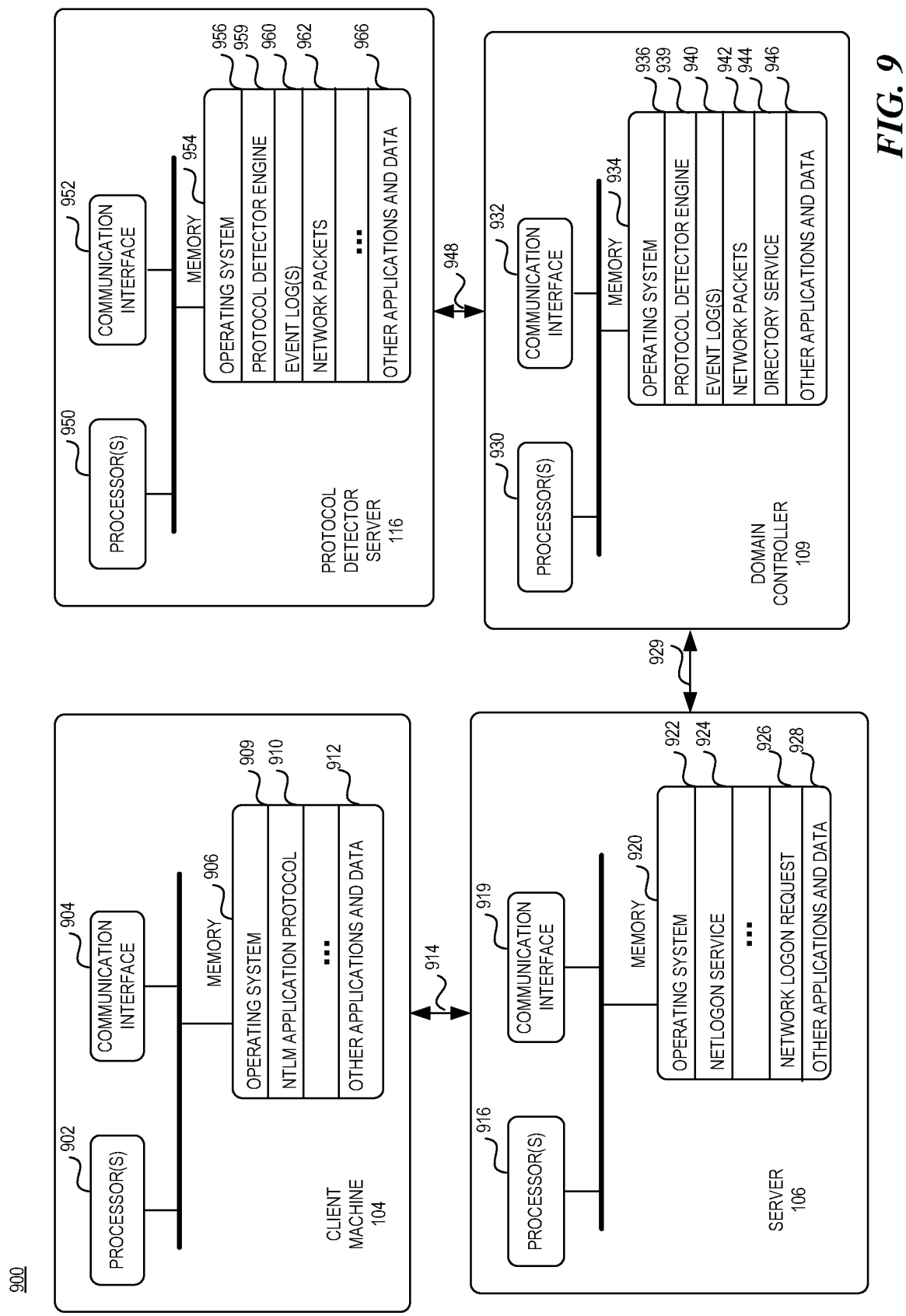
FIG. 9 is a block diagram illustrating a second exemplary operating environment.

Turning to FIG. 9, the aspects may be applied to the second operating environment 900 that utilizes at least client machine 104, a server 106, a domain controller 108 and a protocol version detection server 116. The client machine 104, server 106, domain controller 108 and the protocol version detection server 116 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The second operating environment 800 may be configured in a network environment, a distributed environment, a multi-processor environment, or a stand-alone computing device having access to remote or local storage devices.

Each of the client machines 104, the server 106, the domain controller 108, and the protocol detector server 116 includes one or more processors 902, 916, 930, 950 a communication interface 904, 919, 932, 952 and a memory 906, 920, 934, 954. A processor 902, 916, 930, 950 may be any commercially available or customized processor and may include dual microprocessors and multi-processor architectures. The communication interface 904, 919, 932, 952 facilitates wired or wireless communications between a computing device 104, 106, 108, 116 and other devices. The memory 906, 920, 934, 954 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 906, 920, 934, 954 may also include one or more external storage devices or remotely located storage devices that do not pertain to propagated signals, such as modulated data signals transmitted through a carrier wave.

The memory 906 of the client machine 104 contains instructions, components, and data such as an operating system 909, an NTLM application protocol 910, and other applications and data 912. The memory 920 of the server 106 contains instructions, components, and data, such as, an operating system 922, a Netlogon service 924, network logon request 926, and other applications and data 928. The memory 934 of the domain controller 108 contains instructions, components, and data, such as, an operating system 936, a protocol detector engine 939, one or more event logs 940, network packets 942, a directory service 944, and other applications and data 946. The memory 954 of the protocol detector server 116 contains instructions, components, and data, such as, an operating system 956, a protocol detector engine 959, one or more event logs 960, network packets 962, and other applications and data 966.

The client machine 104 and the server 106 communicate through a first network 914, the server 106 and the domain controller 108 communicate through a second network 929, and the domain controller 108 and the protocol detector server 116 communicate through a third network 948. In one or more aspects, the first, second, and third networks may be the same network or any one of the networks may be the same as one or more of the other networks. The networks 914, 929, 948 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
    at least one processor coupled to a memory;
    the at least one processor is configured to:
        pair a network packet used to facilitate a pass-through authentication request with an authentication request event logged at a domain controller, wherein the network packet includes an encrypted portion having an encrypted response and an encrypted non-response data;
        use a portion of data in the authentication request event to estimate a size of the encrypted non-response data; and
        determine a version of a network logon protocol used to facilitate the pass-through authentication request from an estimated size of the encrypted response, wherein the estimated size of the encrypted response is calculated from the estimated size of the encrypted non-response data.

2. The system of claim 1, wherein the at least one processor is further configured to:
    pair the authentication request event with the network packet based on a time associated with the authentication request event and a time associated with the encrypted network packet being within close temporal proximity.

3. The system of claim 1, wherein the at least one processor is further configured to:
    determine an allowed time differential representing a transit time for the network packet to reach a destination from a source of the network packet; and
    pair the authentication request event with the network packet based on a time associated with the paired event and a time associated with the encrypted network packet being less than an allowed time differential.

4. The system of claim 3, wherein the destination is a domain controller or a protocol detection server.

5. The system of claim 1, wherein the at least on processor is further configured to:
    estimate the size of the encrypted response of the network packet from determining a size of variable-length fields in the paired authentication request event.

6. The system of claim 1, wherein the version of the network logon protocol is NT Lan Manager (NTLM) version one or NTLM version two.

7. The system of claim 1, wherein the at least one processor is further configured to:
    identify from an unencrypted portion of the network packet a second protocol used to transmit the pass-through authentication request to a domain controller.

8. The system of claim 7, wherein the at least one processor is further configured to:
    when the second protocol is a predetermined value, determine a size of select variable-sized fields in the authentication request event; and
    use the size of the select variable-sized fields to estimate the size of the first segment in the encrypted portion of the network packet.

9. A method comprising:
    correlating, at a computing device, an authentication request event logged in a domain controller with a network packet used to facilitate a pass-through authentication request to a domain controller, the network packet including an encrypted portion representing the pass-through authentication request, the encrypted portion including an encrypted response and encrypted non-response data;
    calculating an estimated size of the encrypted response from the size of the encrypted non-response data;
    calculating a size of the encrypted non-response data from corresponding data in the correlated authentication request event; and
    identifying a legacy version of a network logon protocol used to generate the encrypted response from the estimated size of the encrypted response.

10. The method of claim 9, further comprising:
    correlating the authentication request event with the network packet on a closest temporal proximity of the arrival of the authentication request event and the arrival of the network packet.

11. The method of claim 9, further comprising:
determining an allowed time differential between a source of the network packet and the domain controller; and
correlating a time of the authentication request event with a time of the network packet within the allowed time differential.

12. The method of claim 9, further comprising:
determining a size of select fields in the authentication request event; and
using the size of the select fields in the authentication request to determine the size of the encrypted response.

13. The method of claim 9, wherein the authentication request is associated with event identifier 8004.

14. The method of claim 9, wherein the authentication request is associated with event identifier 4776.

15. The method of claim 9, wherein the legacy version of the network logon protocol is NT Lan Manager (NTLM) version two.

16. A device, comprising:
a memory coupled to a processor;
wherein the memory contains instructions that when executed on the processor perform actions that:
match an authentication request event logged in a domain controller with a network packet used to facilitate a pass-through authentication request to a domain controller, the authentication request event and the network packet matched on a close temporal basis, the network packet having an encrypted portion containing an encrypted response and encrypted non-response data;
calculate a size of the encrypted non-response data from corresponding data in the authentication request event;
calculate a size of the encrypted response from the size of the encrypted non-response data; and
identify a version of the network logon protocol that facilitated the pass-through authentication request from the size of the encrypted response.

17. The device of claim 16, wherein the memory contains instructions that when executed on the processor perform actions that:
correlate the authentication request event with the network packet on a closest temporal proximity of the arrival of the authentication request event and the arrival of the network packet.

18. The device of claim 16, wherein the memory contains instructions that when executed on the processor perform actions that:
determine an allowed time differential between a source of the network packet and the domain controller; and
correlate a time of the authentication request event with a time of the network packet within the allowed time differential.

19. The device of claim 16, wherein the memory contains instructions that when executed on the processor perform actions that:
upon determining that the identified version of the network logon protocol is a legacy protocol, deter usage of the legacy protocol.

20. The device of claim 16, wherein the network logon protocol is NT Lan Manager (NTLM).

* * * * *